США011927290B2

(12) United States Patent
Le Polotec et al.

(10) Patent No.: US 11,927,290 B2
(45) Date of Patent: Mar. 12, 2024

(54) MULTIPURPOSE CONNECTOR FOR AN AIRCRAFT MONUMENT AND AIRCRAFT MONUMENT, AIRCRAFT AREA AND AIRCRAFT HAVING A MULTIPURPOSE CONNECTOR

(71) Applicant: Airbus Operations GmbH, Hamburg (DE)

(72) Inventors: Christian Le Polotec, Hamburg (DE); Tammo Bahns, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 907 days.

(21) Appl. No.: 16/824,058

(22) Filed: Mar. 19, 2020

(65) Prior Publication Data
US 2020/0300398 A1   Sep. 24, 2020

(30) Foreign Application Priority Data
Mar. 22, 2019   (DE) ...................... 10 2019 107 359.6

(51) Int. Cl.
*F16L 39/00*   (2006.01)
*B64D 11/00*   (2006.01)
(Continued)

(52) U.S. Cl.
CPC .............. *F16L 39/00* (2013.01); *B64D 11/00* (2013.01); *B64D 11/02* (2013.01); *B64D 11/04* (2013.01)

(58) Field of Classification Search
CPC .......... B64D 11/00; B64D 11/02; Y02T 50/40
See application file for complete search history.

(56) References Cited

U.S. PATENT DOCUMENTS 3,290,763 A * 12/1966 Zahuranec .............. F16L 39/00
                                                                29/237
4,643,458 A *  2/1987 Ammar ............... F01N 13/1805
                                                                285/412
(Continued)

FOREIGN PATENT DOCUMENTS

DE           2624241 A1    12/1977
DE     102005003436 A1 *  8/2005    ........... B64C 1/1453
(Continued)

OTHER PUBLICATIONS

English Translation of German Search Report for corresponding German Patent Application No. 102019107359.6 dated Mar. 5, 2020.

*Primary Examiner* — Zachary T Dragicevich
*Assistant Examiner* — James A Linford
(74) *Attorney, Agent, or Firm* — Greer, Burns & Crain, Ltd.

(57) ABSTRACT

A multipurpose connector for connecting a multiplicity of lines of an aircraft monument. The multipurpose connector comprises a base bracket, a system connector plate configured to receive a multiplicity of first line adapters, a monument connector plate configured to receive at least one second line adapter, and a movement device configured to move the system connector plate relative to the base bracket and the monument connector plate between an open position and a closed position. The system connector plate is, in the closed position, arranged relative to the monument connector plate such that the at least one second line adapter of the monument connector plate is operatively connected to an associated first line adapter of the system connector plate, and, in the open position of the system connector plate, the multiplicity of first line adapters and the at least one second line adapter are detached from one another.

16 Claims, 9 Drawing Sheets

(51) Int. Cl.
*B64D 11/02* (2006.01)
*B64D 11/04* (2006.01)

(56) References Cited

U.S. PATENT DOCUMENTS

| | | | | |
|---|---|---|---|---|
| 4,915,419 | A | * | 4/1990 | Smith, III ............... F16L 37/56 285/305 |
| 5,096,230 | A | * | 3/1992 | Pausch .................. F16L 37/004 285/9.1 |
| 5,474,462 | A | | 12/1995 | Yamanashi |
| 6,443,498 | B1 | * | 9/2002 | Liao ....................... F16L 37/56 285/308 |
| 7,258,369 | B2 | * | 8/2007 | Martin .................... F16L 37/56 285/38 |
| 7,703,812 | B2 | * | 4/2010 | Asam .................... E02F 9/2275 285/19 |
| 7,931,047 | B2 | | 4/2011 | Gonnsen et al. |
| 9,016,626 | B2 | | 4/2015 | Schliwa |
| 9,217,528 | B1 | | 12/2015 | Coffland |
| 2005/0230550 | A1 | * | 10/2005 | Dominguez ........... B64D 11/02 244/129.5 |
| 2006/0225200 | A1 | * | 10/2006 | Wierenga ................ B60R 15/00 4/664 |
| 2012/0248245 | A1 | | 10/2012 | Schliwa |
| 2021/0269156 | A1 | * | 9/2021 | Brunner ................. E03F 1/006 |

FOREIGN PATENT DOCUMENTS

| | | | | |
|---|---|---|---|---|
| DE | 102005007058 | A1 | | 8/2006 |
| EP | 1106898 | A2 | * | 6/2001 ............. F16L 39/00 |
| EP | 1848631 | B1 | | 10/2007 |
| GB | 2027145 | A | * | 2/1980 ............... F16L 1/26 |
| WO | WO-2012176673 | A1 | * | 12/2012 ............. F16L 39/00 |

* cited by examiner

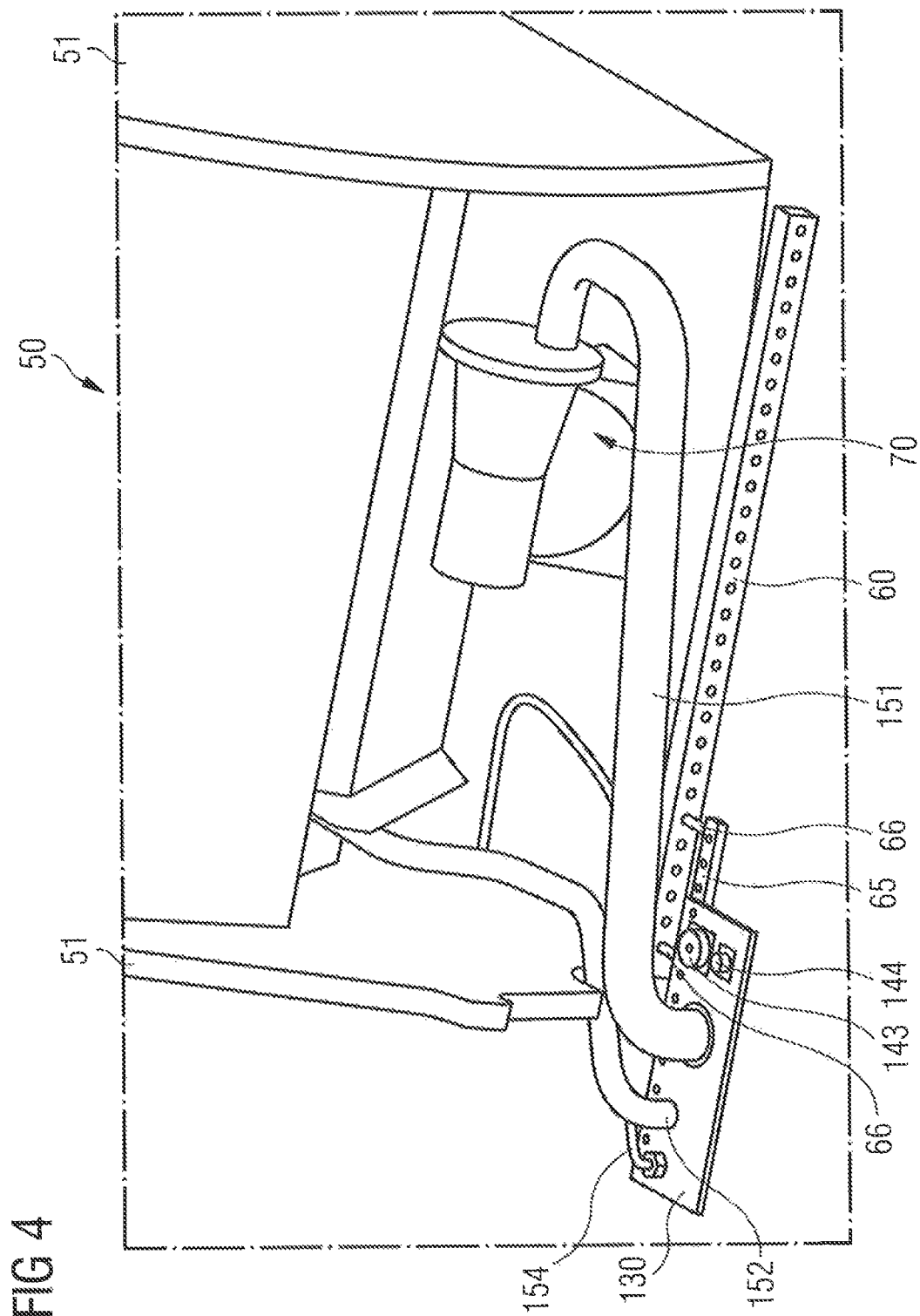

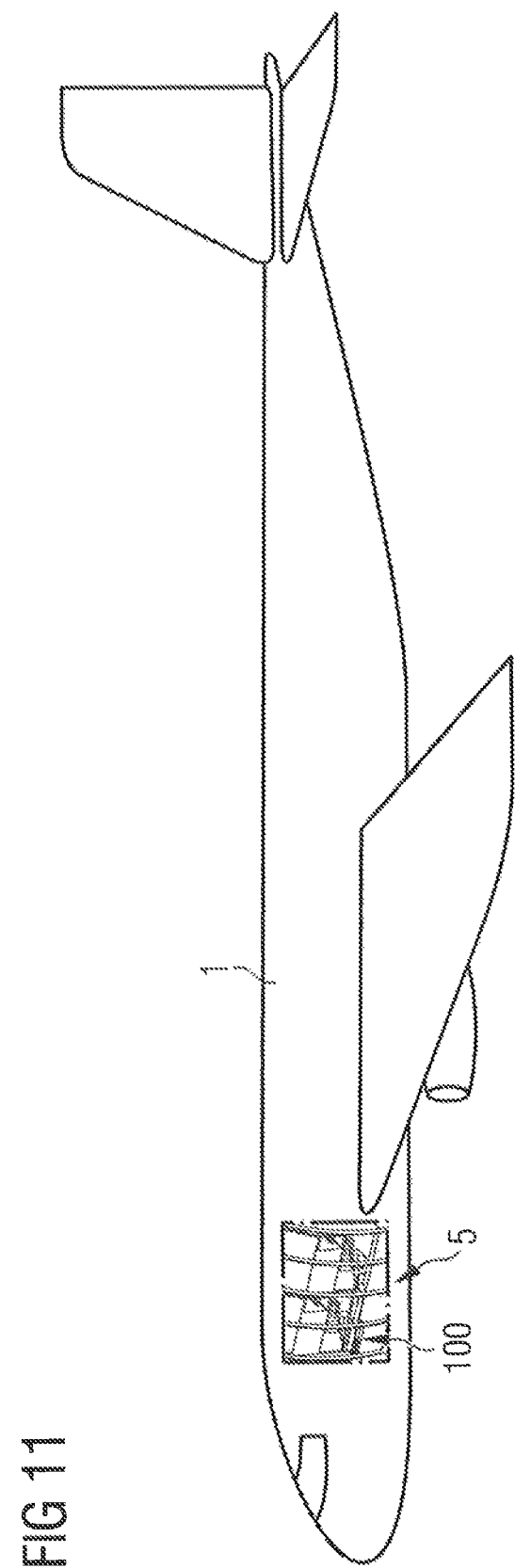

MULTIPURPOSE CONNECTOR FOR AN AIRCRAFT MONUMENT AND AIRCRAFT MONUMENT, AIRCRAFT AREA AND AIRCRAFT HAVING A MULTIPURPOSE CONNECTOR

CROSS-REFERENCES TO RELATED APPLICATIONS

This application claims the benefit of the German patent application No. 10 2019 107 359.6 filed on Mar. 22, 2019, the entire disclosures of which are incorporated herein by way of reference.

FIELD OF THE INVENTION

The invention relates to a multipurpose connector for an aircraft monument, and to an aircraft monument, aircraft area and aircraft having such a multipurpose connector. In particular, the invention relates to a multipurpose connector for connecting a multiplicity of lines of an aircraft monument, and to an aircraft monument having at least one multipurpose connector, to an aircraft area having at least one multipurpose connector and/or having at least one aircraft monument, and to an aircraft having at least one multipurpose connector and/or having at least one aircraft monument and/or having at least one aircraft area, wherein the multipurpose connector has a system connector plate which can be moved between a closed position and an open position, wherein at least one line adapter of a monument connector plate can be operatively connected to and released from a corresponding line adapter of the system connector plate.

BACKGROUND OF THE INVENTION

For the connection of monuments, for example of a galley or of an aircraft toilet, it is necessary for various lines of the monument to be connected to system lines. For example, an aircraft toilet requires a connection to an electrical supply, fresh water supply and waste water system. In this regard, DE 10 2005 007 058 A1 proposes that line connectors which have to be provided for a monument be combined as a system port. Such system ports have a predefined position in the floor raster of the aircraft. The flexibility in the positioning location of the monument is achieved by means of flexible feed lines, such that the monument can be displaced within the scope of the system port flexibility without disconnecting the system connector installation. The flexibility of the feed lines may be realized by lengths of the lines being variable in a line longitudinal direction.

SUMMARY OF THE INVENTION

The invention is based on an object of providing a multipurpose connector for a monument, an aircraft monument, an aircraft area and an aircraft having a multipurpose connector of said type, in the case of which as flexible as possible an arrangement of the aircraft monument permits an easy connection of lines of the aircraft monument.

According to a first aspect for improved understanding of the present disclosure, a multipurpose connector for connecting a multiplicity of lines of an aircraft monument comprises a base bracket, a system connector plate, and a monument connector plate. The system connector plate is configured to receive a multiplicity of first line adapters, and the monument connector plate is configured to receive at least one second line adapter.

The first line adapters of the system connector plate may be connected to a system line. A system line is a line installed in an aircraft, for example electrical line, fresh water line, waste water line (sewage and/or gray water), vacuum line, coolant line, fresh-air line, exhaust-airline, etc., to which one or more monuments and/or other consumers can be connected. For example, the system line may be installed in a longitudinal direction of the aircraft, and multiple monuments/consumers may be connected thereto at various locations within the aircraft. For example, there may be integrated into the system line a T-piece which connects an associated line adapter of the system connector plate to the (main) system line.

The multipurpose connector furthermore comprises a movement device which is configured to move the system connector plate relative to the base bracket and the monument connector plate between an open position and a closed position. In other words, the system connector plate is moved relative to the base bracket and also relative to the monument connector plate. For example, the system connector plate is moved in a space between the base bracket and the monument connector plate. In the closed position, the system connector plate may be situated closer to the monument connector plate, whereas said system connector plate is situated closer to the base bracket in the open position.

In the closed position, the system connector plate is arranged relative to the monument connector plate such that the at least one second line adapter of the monument connector plate is operatively connected to an associated first line adapter of the system connector plate. An operative connection of a first line adapter to a second line adapter includes a mechanical connection of the two line adapters. For example, a first line adapter is in engagement with an associated second line adapter. In the open position of the system connector plate, the multiplicity of first line adapters and the at least one second line adapter are detached from one another. In other words, the first and second line adapters serve as couplings which can be connected to one another and which connect two line portions (at the system side and at the monument side) to one another.

For this purpose, the multiplicity of first line adapters is arranged on or in the system connector plate at respectively predefined positions. These positions may always be the same, in standardized fashion, for a multiplicity of multipurpose connectors. Correspondingly, the at least one second line adapter is also situated on or in the monument connector plate at a predefined position, which corresponds to a position of the associated first line adapter of the system connector plate. In the case of a multiplicity of second line adapters, each second line adapter is situated at a respective predefined position on or in the monument connector plate. If the system connector plate now moves into the closed position, the multiplicity of first line adapters is moved in each case toward an associated second line adapter in the monument connector plate, until said line adapters are operatively connected.

In this way, with a single movement of the system connector plate, the at least one second line adapter (and thus also a multiplicity of second line adapters) can be connected to a corresponding system line. This enables all lines for a monument to be connected by means of a single movement of the system connector plate, and likewise enables all lines for the monument to be detached from the system lines. It is thus possible for a monument to be prefabricated, wherein the monument connector plate of the multipurpose connector can be already fitted on the monument. After installation of the monument into the aircraft (for example on the Final Assembly Line—FAL), it is then merely necessary for the system connector plate to be moved into the closed position by means of the movement device, and the monument is fully connected to the associated system lines. In particular in relation to the conventional flexible connector lines, there is the advantage here that the installation of the multipurpose connector (both of the base bracket with system connector plate onto the aircraft structure, and also of the monument connector plate onto the monument) can be automated. For example, it is easier for robots to move and install dimensionally stable components, whereas flexible lines are more difficult for robots to handle. In this way, the multipurpose connector described here permits fast, simple and inexpensive assembly.

The system connector plate of the multipurpose connector may comprise all first line adapters and may also be connected to all available system lines, whereas the monument connector plate has only the second line adapters that are required for the specific monument. Those first line adapters in the system connector plate which are not required may for example be closed off by means of closure caps or the like. In this way, during later operation of the aircraft, a monument can be easily exchanged, for example an additional toilet can be installed instead of a galley, or vice versa, without the need for time-consuming installation of system lines to the monument.

Likewise, the multipurpose connector makes it possible for the monument connector plate to be configured for a specific monument type. If the specific monument requires no waste water connector or vacuum connector (or other connector), for example, then either the positions for the associated second lines adapters may remain unoccupied, or the monument connector plate is completely omitted at this location, in other words, a monument connector plate may for example be only large enough for the required second line adapters to be attached therein. A corresponding grouping of the line adapters (both in the system connector plate and the monument connector plate) permits a reduction in the size of the monument connector plate, and thus a weight saving.

In one embodiment variant, the movement device comprises a threaded spindle and a nut which is screwed onto the threaded spindle and which is connected to the system connector plate. A rotation of the threaded spindle effects a movement of the nut along a longitudinal axis of the threaded spindle. Owing to the connection of the nut to the system connector plate, the system connector plate is also moved along the longitudinal axis of the threaded spindle. By means of a rotation of the threaded spindle, it is thus possible to effect a movement of the system connector plate between the open position and closed position.

Furthermore, the threaded spindle may be configured for a rotating tool to be connected thereto in order to perform the rotation of the threaded spindle. For example, the threaded spindle may have, at an accessible end, a fixed nut head, an Allen connector, an opening or cutout of predefined shape (for example a slot, a cross or a multiplicity of bores), or some other form, which can be coupled to a corresponding tool in order to transmit a rotation from the tool to the threaded spindle.

Alternatively or in addition, the movement device may comprise a rotatably mounted lever which is operatively connected to the system connector plate. Here, a rotation of the lever may effect a movement of the system connector plate between the open position and closed position. For example, the lever may be fastened rotatably to the system connector plate or to the base bracket and have a cam which, when the lever rotates, increases or decreases a spacing between the system connector plate and the base bracket. Alternatively or in addition, the lever may also have a slot in which a pin is arranged in sliding fashion, which pin is in turn fastened to the base bracket or to the system connector plate (depending on whether the lever is fastened rotatably to the system connector plate or to the base bracket). As a result of rotation of the lever, the pin bears against a side of the slot and is forced to slide in a longitudinal direction of the slot. In this way, the base bracket or system connector plate, to which the pin is fastened, can be moved. It is likewise alternatively possible for the lever to also be connected to the threaded rod in order to rotate the latter. In this way, the use of a tool can be omitted.

In a further embodiment variant, the multipurpose connector may furthermore comprise at least one guide pin which is fastened to one of the system connector plate and the base bracket and which is mounted in sliding fashion on the other of the system connector plate and the base bracket. The guide pin may in particular be arranged such that a sliding direction of the pin corresponds to the movement direction of the system connector plate between the closed position and the open position. In other words, the at least one guide pin guides the system connector plate in its movement between the closed position and the open position.

Furthermore, the at least one guide pin may also be elongated in the direction of the monument connector plate. This enables the monument connector plate to be set down onto the at least one guide pin, whereby the monument connector plate and the system connector plate are fixed relative to one another parallel to the plane of the monument connector plate or system connector plate. This facilitates a connection of the first and second line adapters during the movement of the system connector plate into the closed position. Furthermore, it is also possible for the monument connector plate to be brought into the correct position relative to the system connector plate. For example, the guide pin may have, between system connector plate and monument connector plate, a length which corresponds to the maximum movement of the system connector plate, in order to ensure that the movement of the system connector plate is adequate for the secure connection of the first and second line adapters.

Through the use of multiple guide pins and in particular by means of an arrangement of said guide pins and associated plain bearings in an asymmetrical manner, the system connector plate can be installed only in one particular position in relation to the base bracket and/or the monument connector plate can be installed only in one particular position in relation to the system connector plate. This avoids a situation in which first and second line adapters do not fit together when the system connector plate is moved into the closed position.

In yet a further embodiment variant, each line adapter (both first and second line adapter) may comprise at least one of the following: a guide surface, a seal and an electrical contact. In other words, each line adapter may comprise one or more guide surfaces, one or more seals and/or one or more electrical contacts. A guide surface may be arranged correspondingly to a guide pin such that a corresponding line adapter is guided, and thus the system connector plate is guided, during the movement of the system connector plate between the open position and the closed position. Here, it is possible for the system connector plate to be guided into the correct closed position only by means of the line adapters or additionally by means of at least one guide pin. For example, first and second line adapters may have conical guide surfaces at which, in particular, the initial contact between the two line adapters occurs when the system connector plate moves from the open position into the closed position.

A seal must be provided in particular in the case of air, vacuum and water lines in order to effect a reliable fluidic connection between the lines connected to the corresponding line adapters and prevent leakage between the two line adapters. It is self-evidently also possible for at least one line adapter for the connection of electrical lines or other lines to be equipped with a seal. This prevents an ingress of moisture, (condensation) water or other liquids into the lines coupled by means of the line adapters.

In particular for electrical lines (current supply, signal lines, etc.), both the first and the second line adapter may have at least one electrical contact. In order to correctly connect the contacts of the two associated line adapters to one another, it is advantageous if the first and the second line adapter can be installed in the system connector plate and monument connector plate respectively only in one particular position. For example, the line adapter and the system connector plate or monument connector plate respectively may have asymmetrical and corresponding shapes, such that the line adapter can be inserted into and fastened in the associated plate only in one direction.

In another embodiment variant, the multipurpose connector may comprise a signal transmitter which is configured to generate a contact signal when the system connector plate is in the open position and/or closed position. For example, at corresponding positions on the system connector plate and on the monument connector plate (or additionally or alternatively on the base bracket), there may be arranged contacts which enter into operative connection with one another when the system connector plate is in the closed position (or, in relation to the base bracket, in the open position). In a simple embodiment, a switch is provided on the system connector plate, monument connector plate and/or base bracket, which switch is closed or opened as a result of contact with one of the system connector plate, monument connector plate and/or base bracket. Alternatively or in addition, an electrical contact may be provided on the monument connector plate or the base bracket, which electrical contact is touched by a corresponding electrical contact on the system connector plate when the latter is situated in the closed position (or open position). In any case, the contact signal generated by the signal transmitter can be interrogated during the installation of the monument (on the FAL) and/or in the cockpit in order to check the secure connection of the monument by means of the multipurpose connector directly after the installation of the monument and/or during the later operation of the aircraft.

According to a second aspect for improved understanding of the present disclosure, an aircraft monument comprises at least one monument connector plate of a multipurpose connector according to the first aspect or one of the embodiment variants thereof, and comprises at least one line. The aircraft monument may self-evidently also comprise at least one multipurpose connector according to the first aspect or one of the embodiment variants thereof, and comprise at least one line. In each case one line of the at least one line is connected to the at least one second line adapter of the monument connector plate and connects the associated second line adapter to a device arranged in the monument.

If the monument requires only a single line for the connection of the device arranged in the monument, the multipurpose connector also provides only a single second line adapter on its monument connector plate. In the case of a multiplicity of lines of the monument that must be connected to system lines, a corresponding number of second line adapters is provided in the monument connector plate of the multipurpose connector, which second line adapters are connected in each case to an associated line of the monument.

In one embodiment variant, the aircraft monument may furthermore comprise at least one holding device which is configured to fasten the monument connector plate of the multipurpose connector at variable positions. The holding device may be provided for example in the form of a rail on the monument. The monument connector plate may in this case be fastened at any desired position along a longitudinal direction of the rail. For this purpose, the monument connector plate may have a portion which can be mounted onto the cross section of the rail and which is thus fastened to the rail so as to slide in the longitudinal direction thereof. By means of a fastener, the monument connector plate can also be fixed in the longitudinal direction of the rail.

Alternatively or in addition, the rail may have openings which are provided at predefined intervals in the rail, wherein a fastening device of the monument connector plate can interact with at least one such opening (for example by means of a pin which can be introduced into the opening) in order to fix the monument connector plate at the corresponding position of the rail in multiple degrees of freedom (and, in particular, in a longitudinal direction of the rail).

The holding device (rail) of the aircraft monument may be arranged so as to run substantially parallel to the aircraft longitudinal axis in the installed state of the monument in an aircraft. The system lines commonly also run in this direction along the aircraft structure, such that the multipurpose connector (in particular the base bracket and system connector plate) is also positioned at a particular location in the aircraft along this direction. The monument connector plate can, by means of the holding device, be quickly adapted to the corresponding position of the base bracket and system connector plate of the multipurpose connector, whereby the monument can be installed quickly and in particular easily connected to the system lines of the aircraft.

In a further embodiment variant, the aircraft monument may comprise an aligning device which is configured to be fastened at variable positions to the holding device and which is furthermore configured to fasten the monument connector plate to the aligning device at variable positions relative to the aligning device. For example, the aligning device may be provided in the form of a rail which is shorter than the holding device. The aligning device may likewise have openings for the fastening of the monument connector plate, which openings however have a shorter raster (a smaller spacing) than openings on the holding device. Thus, in a specific embodiment variant, the aligning device can be roughly oriented by means of the openings in the holding device and adapted to a region in which the system connector plate of the multipurpose connector will be, while the position of the monument connector plate is determined by means of the aligning device so as to correspond to that of the system connector plate. The monument connector plate can then also be fastened to the aligning device.

Alternatively or in addition, the holding device and/or aligning device may also be configured such that the monument connector plate can be fastened thereto in sliding fashion. It is thus possible for the monument connector plate to be attached for example to the holding device or aligning device, wherein the monument connector plate is still displaceable in a longitudinal direction of the holding device or aligning device. Only as a result of actuation of a closing device (for example quick-action fastener, bolt, etc.) is the monument connector plate fixed to the holding device or aligning device. The same principle can also be applied to a fixing of the aligning device to the holding device.

In another embodiment variant, the monument connector plate of the at least one multipurpose connector may be arranged parallel to a rear wall of the monument. In other words, the main plane of the monument connector plate is oriented substantially vertically (Z axis) and in an aircraft longitudinal direction (X axis; after installation of the monument in the aircraft). In this way, it is not only the case that space is gained in the depth direction of the monument (transverse direction of the aircraft; Y axis). It is also not possible for any water to collect on the monument connector plate, which can result in any line adapters and lines (in particular electrical lines) being damaged. Since the multipurpose connector is normally arranged between the aircraft fuselage and the rear side of the monument, condensation water can form here, which can however run off the vertical monument connector plate. Likewise, upon opening of the multipurpose connector (movement of the system connector plate into the open position), water is prevented from dripping from one of the line adapters onto an (electrical) line and/or a line adapter of an electrical line and being able to ingress into the latter.

In a further embodiment variant, the aircraft monument may furthermore comprise a base bracket and a system connector plate of a further multipurpose connector, that is to say at least parts of a second multipurpose connector. The further multipurpose connector may be an additional multipurpose connector which is additionally provided for the connection of lines of the monument. For example, the base bracket and the system connector plate of the further multipurpose connector may be arranged on or in a side wall of the monument. Alternatively, the aircraft monument may comprise the monument connector plate of the further multipurpose connector, wherein the monument connector plate is arranged on or in a side wall of the monument. In other words, a part of the further multipurpose connector, which has first or second line adapters, is situated in a side wall of the aircraft monument.

For example, the aircraft monument may furthermore have at least one line, wherein in each case one line is connected to the at least one line adapter of the monument connector plate of the further multipurpose connector and connects the associated line adapter to a line adapter of the monument connector plate of the multipurpose connector. In other words, by means of the at least one line, the (originally first) multipurpose connector for the connection of the aircraft monument to system lines is connected to the further multipurpose connector. Here, in each case one line is provided between two corresponding line adapters. This enables the system line(s) of the aircraft to be led onward from the (main) multipurpose connector to the further multipurpose connector.

By arranging a further aircraft monument adjacent to the (first) aircraft monument, the further aircraft monument can likewise be connected to the system line(s) of the aircraft. For this purpose, the further aircraft monument has either a monument connector plate or a base bracket and system connector plate of a multipurpose connector in order to be connected to the corresponding counterpart of the further multipurpose connector of the (first) aircraft monument.

Thus, by means of the movement device of the further multipurpose connector, the system connector plate of the further multipurpose connector can be quickly connected to the associated monument connector plate on the other aircraft monument. In this way, a connection between the two aircraft monuments can be produced quickly and easily by means of the further multipurpose connector. Furthermore, only one aircraft monument has to have a connection to the system lines of the aircraft. The installation of the further aircraft monument is thus easier and quicker.

According to a third aspect for improved understanding of the present disclosure, an aircraft area comprises at least one multipurpose connector according to the first aspect, and/or at least one aircraft monument according to the second aspect. Here, for example, the base bracket of the multipurpose connector may be attached to at least one primary structural component of the aircraft area in a position which is fixed relative to the primary structural component. In other words, the base bracket of the multipurpose connector is arranged fixedly on the primary structural component. In this way, system lines of the aircraft can be connected to the first line adapters of the system connector plate at a predefined position, irrespective of the installation and the later exact position of an aircraft monument. This makes it possible for aircraft to be equipped with multipurpose connectors at particular positions without the final layout of the aircraft cabin being known. Also, the system lines to be installed in the aircraft are always the same and independent of the later cabin layout.

In one embodiment variant, the aircraft area furthermore comprises at least one floor element. The base bracket and/or the system connector plate of the multipurpose connector may in this case be arranged independently of the floor element in the aircraft area. In other words, the installation of the base bracket and/or of the system connector plate (of the system-side part of the multipurpose connector) takes place independently of the installation of the floor elements in the aircraft area.

Alternatively, the base bracket and/or the system connector plate of the multipurpose connector may be integrated into the floor element. In this way, too, it is possible to realize a predefined position of the system connector plate (of the system-side part of the multipurpose connector). Here, system lines can be easily connected from the underside of the floor element to the first line adapters of the system connector plate.

In yet a further embodiment variant, the aircraft area has an aircraft monument with a monument connector plate arranged parallel to a rear wall of the aircraft monument. The monument connector plate may in this case be arranged on the aircraft monument such that the at least one line adapter of the monument connector plate and the multiplicity of line adapters of the system connector plate of the multipurpose connector correspond in terms of their position and assume the open position of the system connector plate when the aircraft monument is arranged and fastened in the aircraft area. In other words, with the installation and fastening of the aircraft monument, the monument connector plate (which may already be provided in advance on the rear side of the aircraft monument) is brought into a corresponding position relative to the system connector plate. Alternatively or in addition, a holding device and/or aligning device as described above may be used in order to bring the monument connector plate into the correct corresponding position relative to the system connector plate. In any case, monuments can be produced already with the monument connector plates and thus already with fixedly installed lines within the monument before these are introduced into the aircraft on the FAL. The thus achieved decoupling of the time for the installation of lines for a monument accelerates the installation of the aircraft monument on the FAL.

According to a fourth aspect for improved understanding of the present disclosure, an aircraft comprises at least one multipurpose connector according to the first aspect, and/or at least one aircraft monument according to the second aspect, and/or at least one aircraft area according to the third aspect or one of the respective associated embodiment variants.

The above-described aspects, embodiments and variants may self-evidently be combined, without this being explicitly described. Each of the described embodiment variants is thus optional with regard to each of the aspects, embodiments and variants, or even combinations of these. The present disclosure is not restricted to the individual embodiments and embodiment variants in the described sequence or in a particular combination of the aspects and embodiment variants.

BRIEF DESCRIPTION OF THE DRAWINGS

A preferred embodiment of the invention will now be discussed in more detail on the basis of the appended schematic drawing, wherein FIGS. 1 to 3 schematically show a perspective view of a multipurpose connector in a closed position and side views of the multipurpose connector in an open position and closed position;

FIG. 4 schematically shows a perspective view of an aircraft monument with a multipurpose connector;

FIG. 11 schematically shows an aircraft with an aircraft area with a multipurpose connector.

DETAILED DESCRIPTION OF THE PREFERRED EMBODIMENTS

Figure 1:
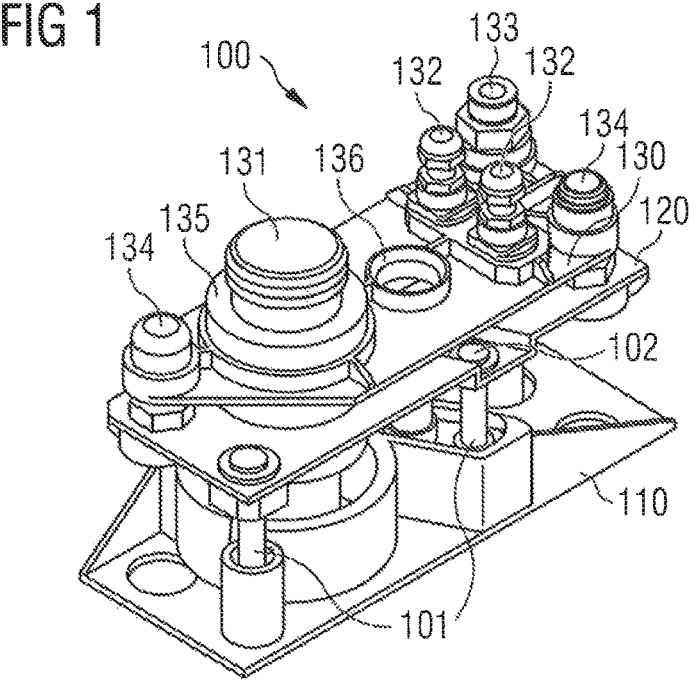
Figure 2:
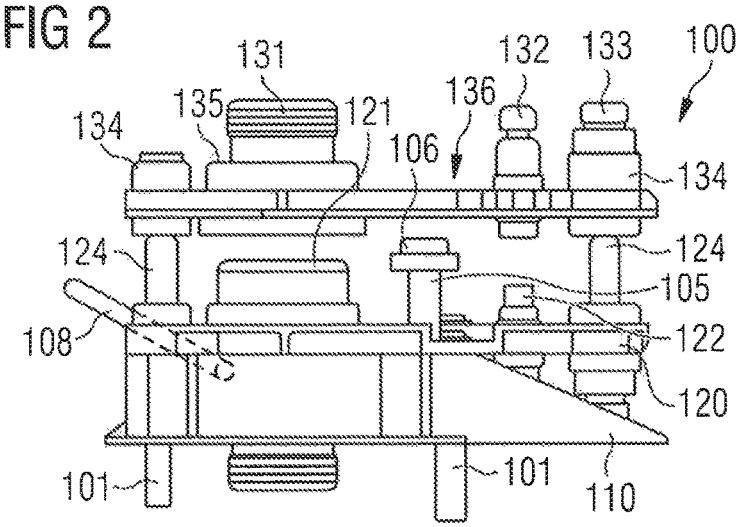
Figure 3:
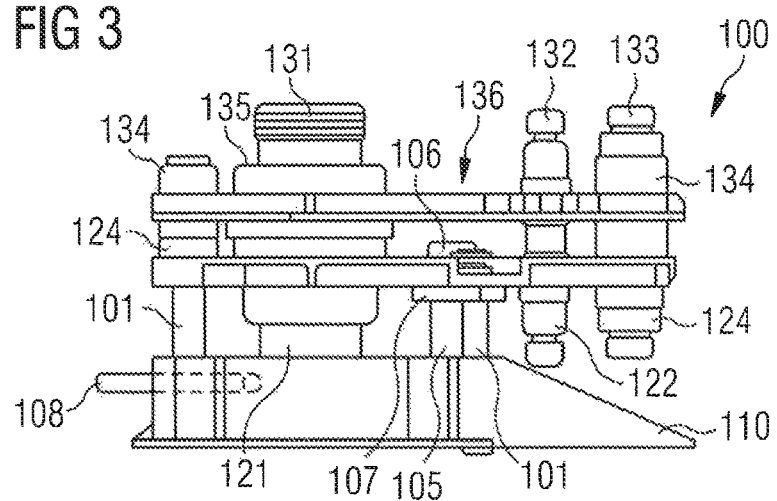

FIG. 1 schematically shows a perspective view of a multipurpose connector 100, and FIGS. 2 and 3 show the multipurpose connector 100 in a side view in an open position (FIG. 2) and closed position (FIG. 3). The multipurpose connector 100 comprises at least one base bracket 110, which may be configured to be fastened to a primary structure 2 or other structural component of an aircraft 1 (see FIG. 11). Guide pins 101 are mounted slidingly in the base bracket 110. Furthermore, a movement device in the form of a threaded spindle 105 is provided, which will be discussed in more detail. Alternatively or in addition to the threaded spindle 105, a movement device in the form of a lever 108 (FIGS. 2 and 3) may be rotatably mounted on the base bracket 110.

The multipurpose connector 100 furthermore comprises a system connector plate 120 which is configured to receive a multiplicity of first line adapters 121-124. The first line adapters 121-124 are, for example, inserted into, and fastened in, openings in the system connector plate 120. Thus, each of the first line adapters 121-124 can serve for the connection of a respective system line (not illustrated), wherein the system line(s) is, in FIGS. 1 to 3, connected from below to the respective first line adapter 121-124. For example, the line adapter 121 may be used for the connection to a waste water line of the aircraft 1, the line adapter 122 may be used for the connection to a vacuum line of the aircraft 1, the line adapter 123 may be used for the connection to a fresh water line of the aircraft 1, and the line adapter 124 may be used for the connection to a current line of the aircraft 1. It is self-evidently possible for other lines to be connected to the adapters.

The multipurpose connector 100 furthermore comprises a monument connector plate 130, which is configured to receive a multiplicity of second line adapters 131-134. Each second line adapter 131-134 may be inserted in a corresponding opening in the monument connector plate 130 and installed thereon by means of a fastener 135. For this purpose, the second line adapter 131-134 may have a flange or similar projection (not visible) on that side of the monument connector plate 130 which is situated opposite the fastener 135, whereby the second line adapter 131-134 can be fixedly clamped to the monument connector plate 130. The same fastening principle may be applied to the first line adapters 121-124, which are hidden in FIGS. 1 and 3.

The multipurpose connector 100 furthermore offers the possibility of connecting to the second line adapters 131-134 of the monument connector plate 130 in each case one line 151, 152, 154 (see FIG. 4) which connects the associated line adapter 131-134 to a device 70 (see FIG. 4) arranged in the aircraft monument 50. Here, the line 151-154 is connected from above to the respective second line adapter 131-134 in FIGS. 1 to 3.

The movement device 105, 108 is configured to move the system connector plate 120 relative to the base bracket 110 and relative to the monument connector plate 130 between an open position illustrated in FIG. 2 and a closed position illustrated in FIGS. 1 and 3. For this purpose, the system connector plate 120 can be moved by means of the guide pins 101 on a particular path between the base bracket 110 and the monument connector plate 130. In the closed position, every second line adapter 131-134 of the monument connector plate 130 is operatively connected to an associated first line adapter 121-124 of the system connector plate. In other words, in the closed position, a pairwise coupling of the first and second line adapters 121-124, 131-134 is realized.

In the case of the pairwise coupling of the first and second line adapters 121-124, 131-134, the associated lines (system lines (not illustrated) and monument lines 151-154) are likewise connected to one another. Here, depending on the line type, a fluidic connection or electrical connection is produced between the lines and through the line adapters 121-124, 131-134. Here, a valve may be integrated in at least one of the line adapters 121-124, 131-134 for a fluidic connection, such that, when the two line adapters 121-124, 131-134 are separated, the line (system line and/or monument line 151-154) is closed. In this way, an escape of a fluid at the then opened (exposed) line adapter 121-124, 131-134 is prevented.

It can be seen in FIG. 1 that, for material saving, the base bracket 110, system connector plate 120 and monument connector plate 130 may have particular cutouts or geometries. For example, that corner of the monument connector plate 130 which points forward in FIG. 1 has a cutout, because no line adapter 131-134 is provided here.

It can furthermore be seen in FIG. 3 that the movement device in the form of a threaded spindle 105 also comprises a nut 107, which is screwed onto the threaded spindle 105 and which is connected to the system connector plate 120. As a result of rotation of the threaded spindle 105, the nut 107 is moved along an axial direction of the threaded spindle 105 (upward or downward in FIGS. 2 and 3) and thus moves the system connector plate 120 between the open position in FIG. 2 and the closed position in FIG. 3. For the rotation of the threaded spindle 105, the latter may have a head nut 106 or other element which can be placed in engagement with a corresponding tool. In order to engage a tool on the head nut 106, the monument connector plate has an opening 136 (see also FIG. 1). In this way, easy access to and fast actuation of the movement device in the form of the threaded spindle 105 are possible.

As an alternative to the threaded spindle 105, a lever 108 may be rotatably arranged on the base bracket 110 (or alternatively on the system connector plate 120). The lever 108 may be mechanically coupled by means of a cam (not illustrated) or similar component to the system connector plate 120 (or the base bracket 110), wherein a rotational movement of the lever 108 and thus of the cam changes the position of the system connector plate 120 (or the base bracket 110). By means of the guide pins 101, the system connector plate 120 (or the base bracket 110) is moved linearly between the open position illustrated in FIG. 2 and the closed position illustrated in FIG. 3.

The first and second line adapters 121-124, 131-134 may also serve for the guidance of the system connector plate 120 into the closed position. For this purpose, the first line adapters 121-124 may be designed to be relatively long in terms of their longitudinal extent (upward and downward in FIGS. 2 and 3; vertically), whereby they have guide surfaces. Correspondingly, the second line adapters 131-134 may also have a certain longitudinal extent into which the first line adapters 121-124 can be inserted. In this way, secure coupling of the line adapters 121-124, 131-134 and thus of the lines connected thereto is ensured.

Finally, the multipurpose connector 100 may comprise a signal transmitter 102 which is configured to generate a contact signal. For example, the signal transmitter 102 may be arranged on or integrated in a guide pin 101. As soon as the head of the guide pin makes contact with the monument connector plate 130 or a component (not illustrated) specially arranged thereon, the signal transmitter 102 can generate a signal which indicates whether the system connector plate 120 is situated in the open position or in the closed position.

FIG. 4 schematically shows a perspective view of an aircraft monument 50 with a multipurpose connector 100. For a simplified illustration, only the monument connector plate 130 of the multipurpose connector 100 is illustrated. The aircraft monument 50 comprises not only the monument connector plate 130 but also at least one line 151-154 for connecting in each case one second line adapter 131-134 to a device 70 arranged in the aircraft monument 50. For example, the line 151 may be a waste water line, the line 152 may be a vacuum line, and the line 154 may be a fresh water line, which are connected in each case to an associated second line adapter 131, 132 or 134.

A holding device 60, in this case in the form of a rail with openings arranged at regular intervals, serves for the fastening of the monument connector plate 130 at variable positions relative to the aircraft monument 50. The monument connector plate 130 may, for example, be fastened directly to the holding device 60, for example through the use of one or more bolts, pins, etc., which can be placed in engagement with one or more openings of the holding device 60. Alternatively, the monument connector plate 130 may be fastened to an aligning device 65, which in turn is installed on the holding device 60 by means of corresponding fasteners 66. The aligning device 65 may likewise be implemented in the form of a rail with openings provided thereon. The interval of the openings in the aligning device 65 may in this case be smaller than that of the openings in the holding device 60. The monument connector plate 130 can thus be attached at any desired position relative to the monument 50 and quickly displaced into said position. These also include positions outside the monument 50, in particular outside side walls 51 of the monument 50.

It is furthermore illustrated in FIG. 4 that second line adapters 133, 134 may be equipped with covering caps or closure caps 143, 144. Alternatively or in addition, the second line adapters 133, 134 may also each comprise a valve which closes off the line adapter 133, 134 and which automatically opens only in the coupled state with a first line adapter 123, 124. Thus, the second line adapters 133, 134 can be closed off if no associated line is required on the monument 50. Alternatively, the second line adapter 133, 134 may also be omitted, wherein the first line adapters 123, 124 may be closed off by means of covering caps or closure caps (not illustrated) or alternatively or additionally by means of an automatic valve. Correspondingly, the monument connector plate 130 may also be of smaller dimensions if, for the monument 50, no connectors are provided correspondingly to the second line adapters 133, 134. This would on the one hand reduce the overall weight of a multipurpose connector 100, but on the other hand increases the number of different monument connector plates 130 and thus different multipurpose connectors 100.

Figure 5A:
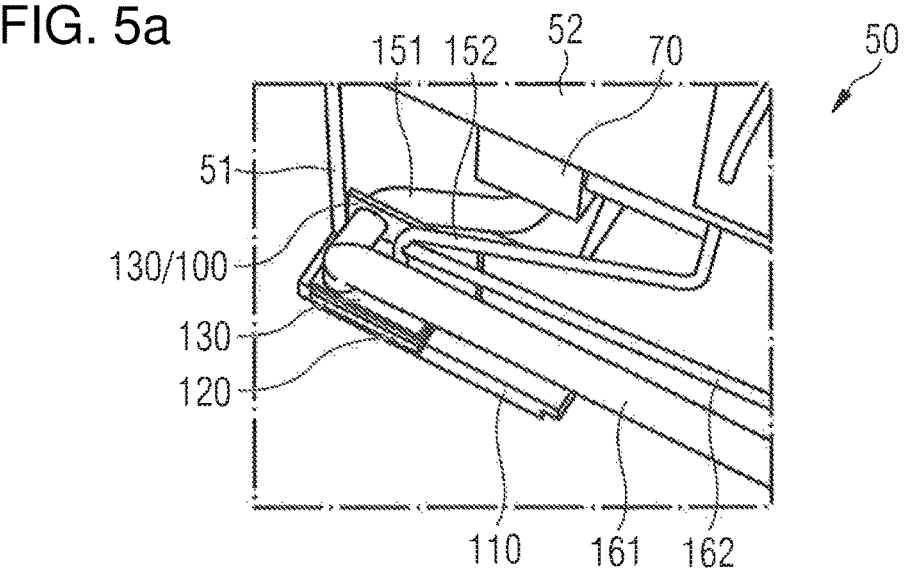
FIGS. 5a, 5b and 5c schematically show perspective views of an aircraft monument with a multipurpose connector in various positions of the aircraft monument relative to the multipurpose connector.
Figure 5B:
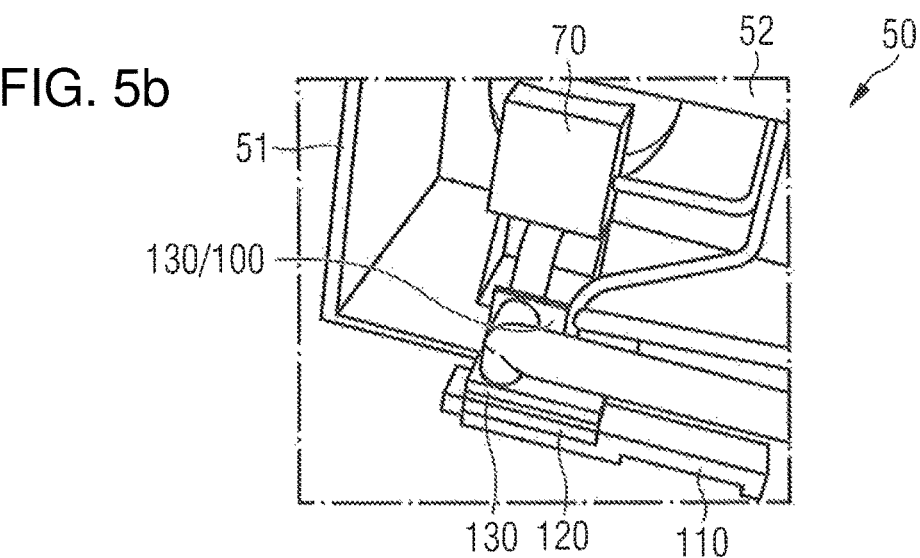
Figure 5C:
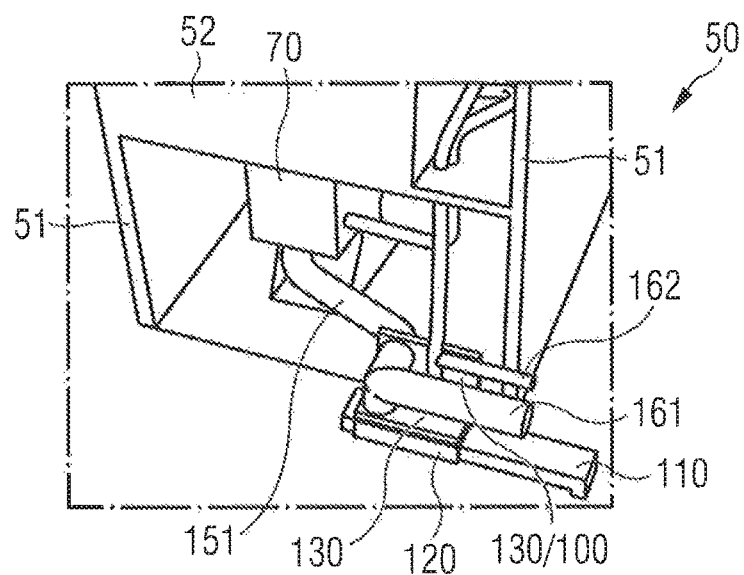

FIGS. 5a-5c schematically show perspective views of an aircraft monument 50 with a multipurpose connector 100 in different positions of the aircraft monument 50 relative to the multipurpose connector 100. The base bracket 110 of the multipurpose connector 100 is, in this embodiment, kept wider than that shown in FIGS. 1 to 3. Here, the base bracket 110 may also comprise an aligning device 65 (FIG. 4). For example, the system connector plate 120 may be arranged at different locations along the base bracket 110 (in FIGS. 5a-5c, in the longitudinal direction of the base bracket 110).

As can be seen in FIGS. 5a, 5b and 5c, the aircraft monument 50 can be displaced relative to the base bracket 110 and thus relative to the multipurpose connector 100. For this purpose, it is merely necessary to change the arrangement of the lines 151, 152 correspondingly to the position of the multipurpose connector 100, in particular of the system connector plate 120. To relocate the aircraft monument 50, it is merely necessary for the system connector plate 120 to be moved into its open position, that is to say, decoupled from the monument connector plate 130. The aircraft monument 50 can subsequently be relocated, and the lines 151, 152 correspondingly routed in the aircraft monument 50. Finally, the system connector plate 120 is moved into its closed position again, and the first line adapters 121-124 of the system connector plate 120 are operatively connected to the second line adapters 131-134 of the monument connector plate 130.

In a further embodiment, a further monument connector plate 130 or a complete multipurpose connector 100 may be provided perpendicular to the rear wall 52 of the aircraft monument 50, such that the monument 50 can be produced as a closed unit and has no elements which project out of an enclosed space of the aircraft monument 50. This makes it possible to realize monuments 50 which are easy to store, and furthermore permits easy separation of the aircraft monument 50 by simply opening the multipurpose connector 100.

It is furthermore illustrated in FIGS. 5*a*, 5*b* and 5*c* that multiple lines may be combined. For example, a line 161, 162 may be led along the monument, which line opens into one of the monument lines 151 or 152. These additional monument lines 161, 162 may lead either to another unit 70 (consumer) in the same monument or to any other unit (not illustrated) for connection to the system lines of the aircraft.

The arrangement of the multipurpose connector 100 illustrated in FIGS. 5*a*-5*c* shows how the same system connector plate 120 of the multipurpose connector 100 can be used in order to arrange the monument 50 at different positions. For example, in FIG. 5*a*, the monument 50 is arranged with one of its side walls 51 directly adjacent to the multipurpose connector 100. As a result of the multipurpose connector 100 being opened (movement of the system connector plate 120 into the open position), the monument 50 is released from all system lines (not illustrated separately in FIGS. 5*a*-5*c*), and can be displaced.

Different positions of the monument 50 are illustrated in FIGS. 5*b* and 5*c*. Here, it is merely necessary for the line 151, 152 which runs in the interior of the monument 50 to be correspondingly adapted in order to correspond to the position of the multipurpose connector 100 (more specifically of the base bracket 110 and of the system connector plate 120). Here, fixed (rigid) lines 151, 152 may be installed in the interior of the monument 50. This allows lines to be routed with optimally adapted line lengths. It is self-evidently also possible for flexible lines to be provided in the interior of the monument 50, whereby the monument connector plate 130 can be displaced without relatively great conversion effort and quickly.

Furthermore, FIGS. 5*a*-5*c* illustrate an implementation variant which simplifies a connection of the lines 151, 152 running in the interior of the monument 50 to the system-side multipurpose connector 100. For this purpose, a further multipurpose connector 100 is provided which is oriented parallel to a rear wall 52 of the monument 50 (that is to say, vertically). In other words, the monument connector plate 130 and the system connector plate 120 are arranged such that their main planes are oriented parallel to the rear wall 52 of the monument 50. In FIGS. 5*a*-5*c*, for simplified illustration, only the monument connector plate 130 is illustrated. It can be seen, in particular, in FIGS. 5*b* and 5*c* that a holding device 53 is provided for the fastening of the multipurpose connector 100 that is oriented parallel to the rear wall 52 of the monument 50. The multipurpose connector 100 can be displaced on said holding device in the transverse direction of the monument 50 (in the aircraft longitudinal direction when the monument 50 is installed in the aircraft 1; X axis) and also fastened to said holding device. The holding device 53 may also be designed correspondingly to the holding device 60 illustrated in FIG. 4.

This additional multipurpose connector 100 permits a removal of the monument 50 with the lines 151, 152 arranged therein, whereas the lines 161, 162 do not need to be varied, and thus devices 70 connected thereto can continue to be used. For example, a monument 50 of a particular type can be exchanged for a monument 50 of another type, for example from a galley to an aircraft toilet, or vice versa.

As an alternative to the multipurpose connector 100, it is also merely possible for a line bracket to be provided without forming a complete further multipurpose connector 100. For example, a monument connector plate 130 with or without line adapters 131-134 may be used for the fastening of the lines 151, 152.

Figure 6:
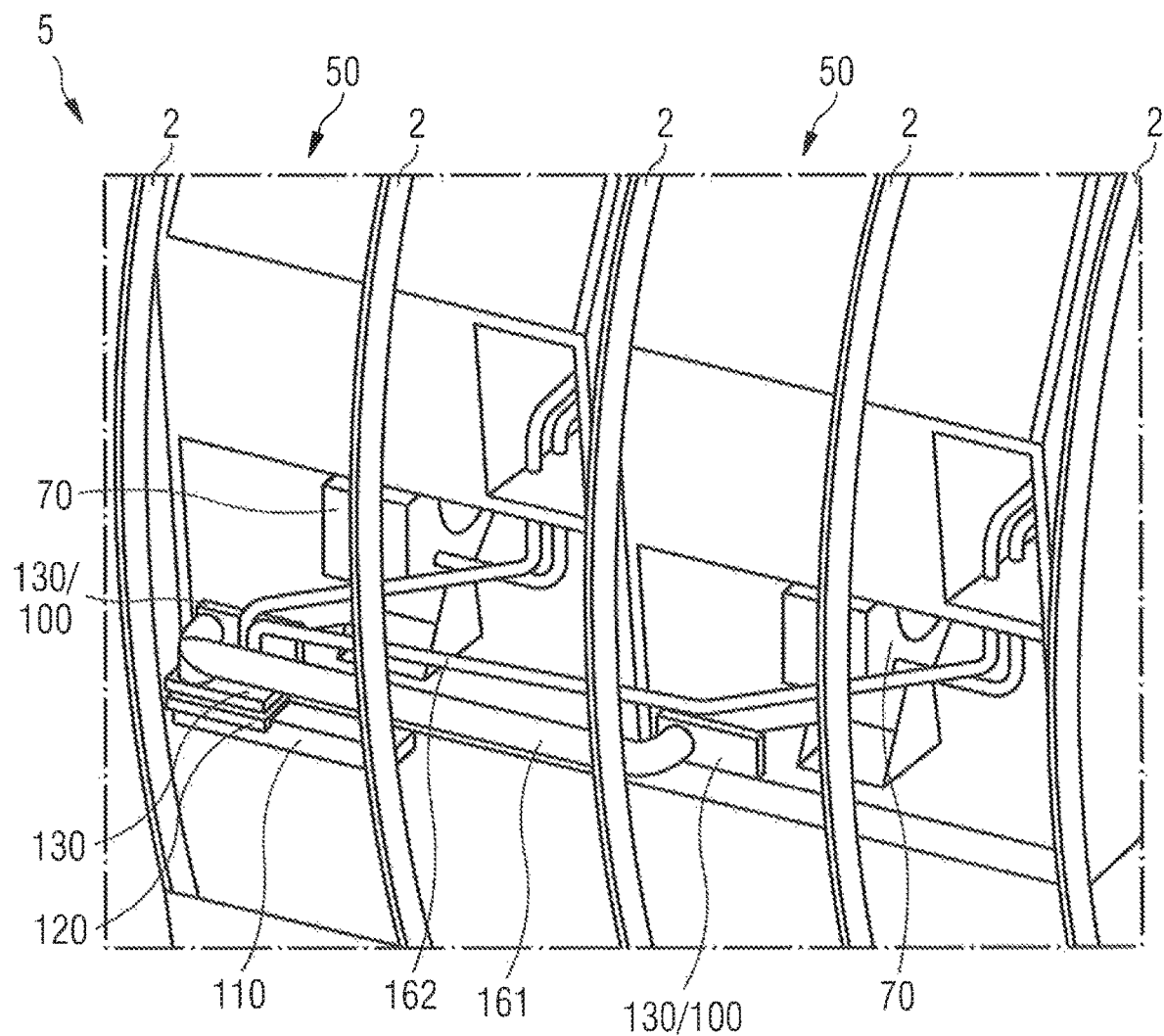
FIG. 6 schematically shows a perspective view of an aircraft area with two monuments and one multipurpose connector.

FIG. 6 schematically shows a perspective view of an aircraft area 5 with two monuments 50 and one multipurpose connector 100. Correspondingly to the illustration in FIG. 5, the multipurpose connector 100 in FIG. 6 is provided at the level of a first monument 50, and lines 161, 162 open into lines 151, 152 and are thus connected jointly, at the multipurpose connector 100, to system-side lines (not illustrated). The further lines 161, 162 serve for the connection of the second monument 50 (illustrated on the right in FIG. 6).

It can be clearly seen in FIG. 6 that the multipurpose connector 100 can be installed on a primary structure of the aircraft 1. For example, the base bracket 110 of the multipurpose connector 100 can be fastened to at least one structural component 2 (in FIG. 6, one or more frames/ribs). In the embodiment variant illustrated, the base bracket 110 is fastened, at a respective end as viewed in a longitudinal direction of the base bracket 110, to an associated frame 2, which gives rise to a stable fastening of the multipurpose connector 100. In this way, the multipurpose connector 100 can be installed, and connected to system-side lines (not illustrated), relatively early in the assembly process of the aircraft.

The two monuments 50 can likewise be prefabricated at an early point in time (and outside the aircraft 1) and quickly and easily connected to the multipurpose connector 100. For example, it is possible for both monuments 50 to be produced together and connected to one another by means of the lines 161, 162. Here, the monument connector plate 130, which is oriented horizontally in FIG. 6, may already be fastened to the two monuments 50. The two monuments 50 are subsequently introduced together into the aircraft fuselage, positioned, fastened, and connected by means of the multipurpose connector 100 (more specifically at the associated system connector plate 120) to the system lines. Alternatively, it is also possible for the lines 161, 162 with two multipurpose connectors 100 connected thereto (more specifically base bracket 110 and system connector plate 120) to firstly be installed in the aircraft 1. For the later simpler installation of the monuments 50, said two multipurpose connectors 100 are oriented vertically. Subsequently, each of the two monuments 50 can be connected to one of the two vertical multipurpose connectors 100. More specifically, firstly, at least one system connector plate 120 is provided at the respective end of the lines 161, 162, while the monuments 50 are equipped with the associated monument connector plate 130. In FIG. 6, for the sake of simplicity, only the monument connector plate 130 is illustrated.

Figure 7:
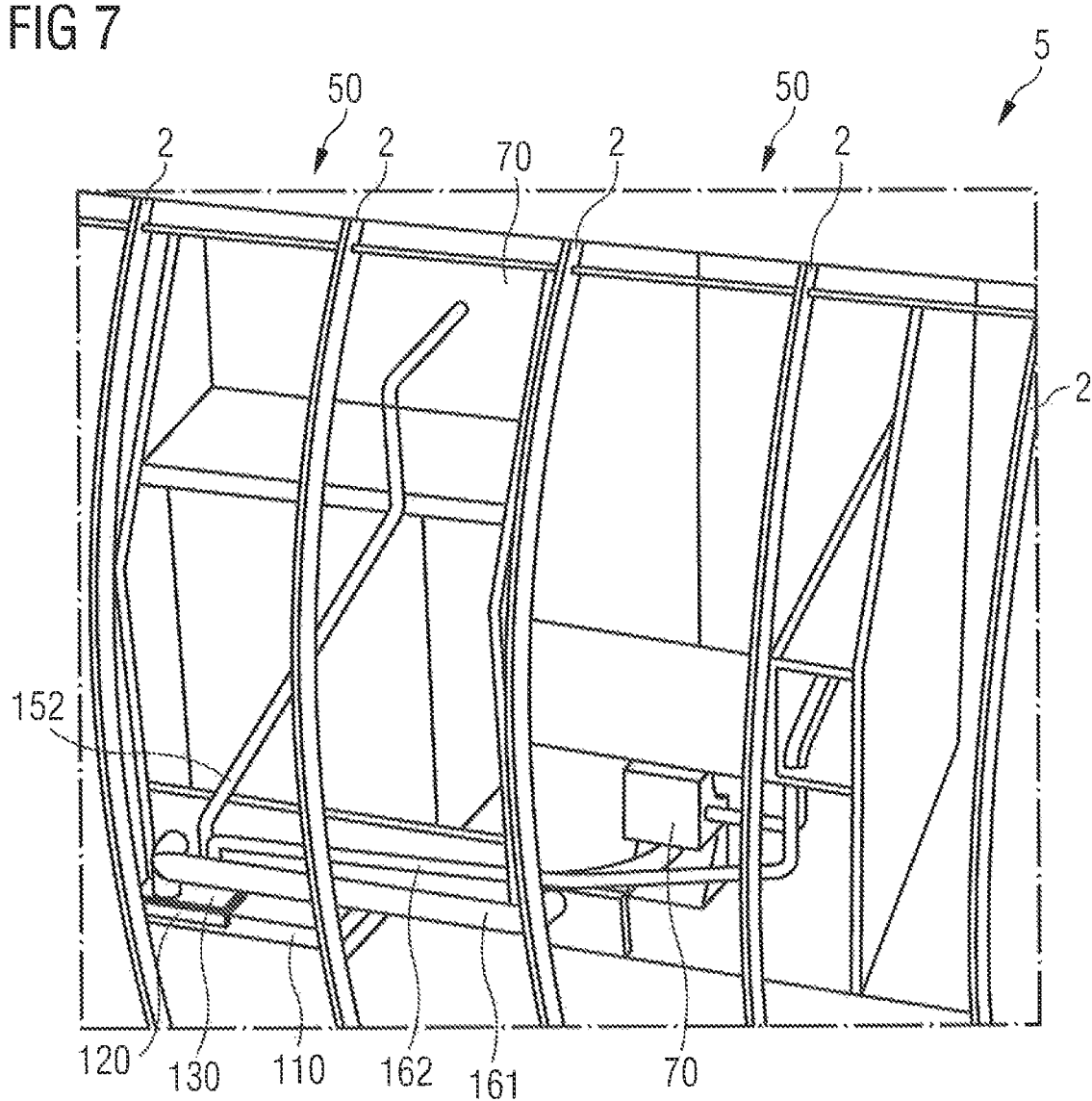
FIG. 7 schematically shows a perspective view of an aircraft area with two different monuments and one multipurpose connector.

FIG. 7 schematically shows a perspective view of an aircraft area 5 with two different monuments and one multipurpose connector 100. The embodiment variant illustrated in FIG. 7 corresponds, for the most part, to that from FIG. 6. It is merely the case that the monument 50 illustrated on the left in both figures has been exchanged. For this purpose, it is merely necessary for one of the two vertical multipurpose connectors 100 to be opened (more specifically for the system connector plate 120 thereof to be moved into the open position) in order to detach the associated monument 50 from the system-side lines. Subsequently, the monument 50 can be removed. In the intervening time, a prefabricated monument 50, in FIG. 7 an aircraft galley, can be introduced into the region of the previously arranged aircraft toilet 50 (FIG. 6). As a result of movement of the system connector plate 120 of the associated vertical multipurpose connector 100 into its closed position, the galley 50 can be quickly and easily connected to the line system of the aircraft 1. Owing to the standardized arrangement of the line adapters 121-124 of the system connector plate 120 and of the line adapters 131-134 of the monument connector plate 130, no modifications need to be made to the system-side lines.

Even installation of a monument 50 of different size is made easier by means of the multipurpose connectors. For example, if the galley 50 (FIG. 7) is narrower or wider than the previously installed aircraft toilet 50 (FIG. 6), the aircraft toilet 50 illustrated on the right in FIGS. 6 and 7 can be detached from its associated vertical multipurpose connector 100. It is subsequently merely necessary for the monument connector plate 130 of the aircraft toilet 50 to be adapted to a new position of the associated vertical multipurpose connector 100, such that more or less space is created for the galley 50 (in the longitudinal direction of the aircraft; X axis). The base bracket 110 and system connector plate 120 of the vertical multipurpose connector 100 for the aircraft toilet 50 (on the right in FIGS. 6 and 7) in this case remains unchanged. For example, the base bracket 110 and/or system connector plate 120 of said vertical multipurpose connector 100 may likewise be fastened to a primary structural component 2 of the aircraft 1, whereby the position thereof in the aircraft is fixedly predefined.

Figure 8:
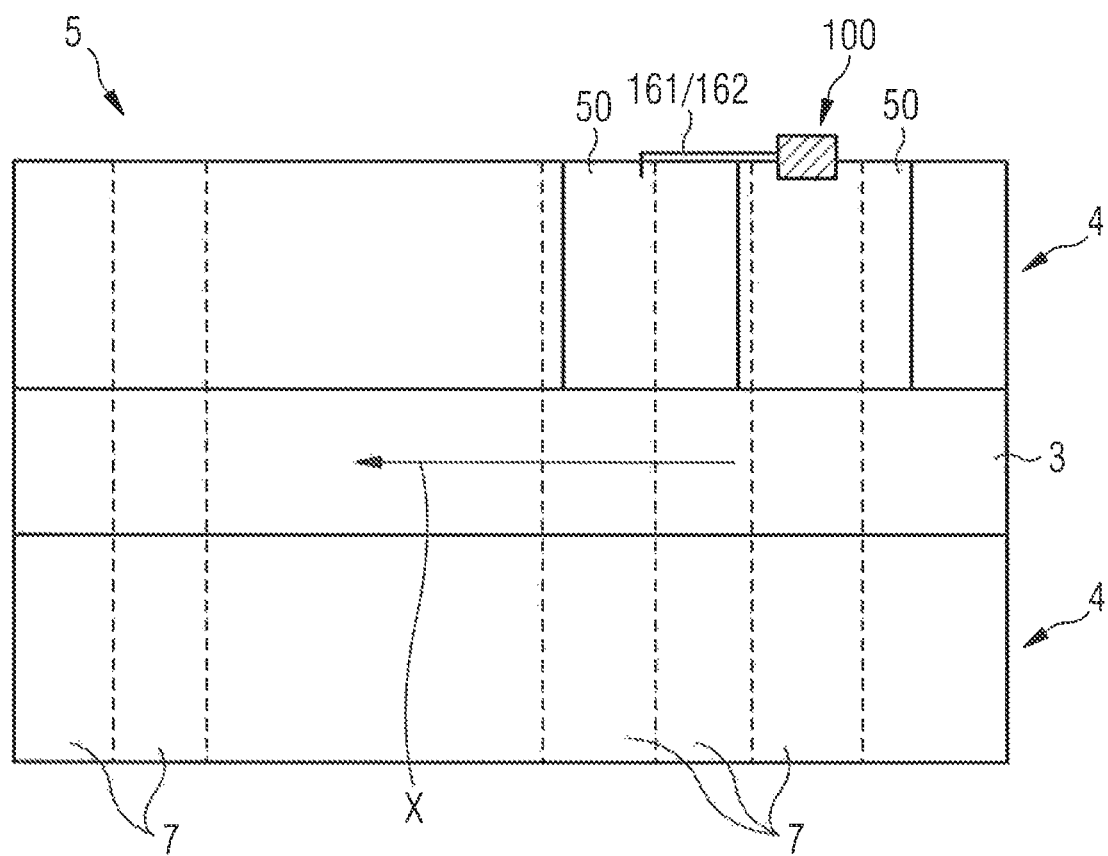
FIG. 8 schematically shows a plan view of an aircraft area with two monuments and one multipurpose connector.

FIG. 8 schematically shows a plan view of an aircraft area 5 with two monuments 50 and a multipurpose connector 100. The aircraft area 5 has a multiplicity of floor elements 7 (only five floor elements are explicitly illustrated in FIG. 8), which are laid transversely with respect to an aircraft longitudinal direction. The aircraft longitudinal direction is denoted as the X axis. Various items of internal equipment of the aircraft 1 may be provided on the floor elements 7. For example, passenger seats (not illustrated), galleys 50, aircraft toilets 50 etc. may be arranged in the areas 4. An aisle 3 may be provided in between.

In the edge region (at one end) of one floor element 7, there may be provided a multipurpose connector 100. Here, the base bracket 110 and/or system connector plate 120 of the multipurpose connector 100 may be fastened to a primary structure of the aircraft 1 (not illustrated in FIG. 8). Alternatively, the base bracket 110 and/or system connector plate 120 of the multipurpose connector 100 may be integrated in one of the floor elements 7. In any case, said multipurpose connector 100 serves for the connection of the monument 50, illustrated on the right in FIG. 8, to system-side lines. Furthermore, correspondingly to the implementation variants illustrated in FIGS. 5a-5c to 7, additional lines 161, 162 may be provided in order to connect a further monument 50 (to the left of the first monument 50 in FIG. 8) to the system-side lines. As can be seen from FIG. 8, the monuments 50 can be arranged in any area in the aircraft longitudinal direction (X axis) and quickly and easily connected to the system-side lines by means of the multipurpose connector 100, which is fixed in its position (in particular, in the X axis direction).

Figure 9:
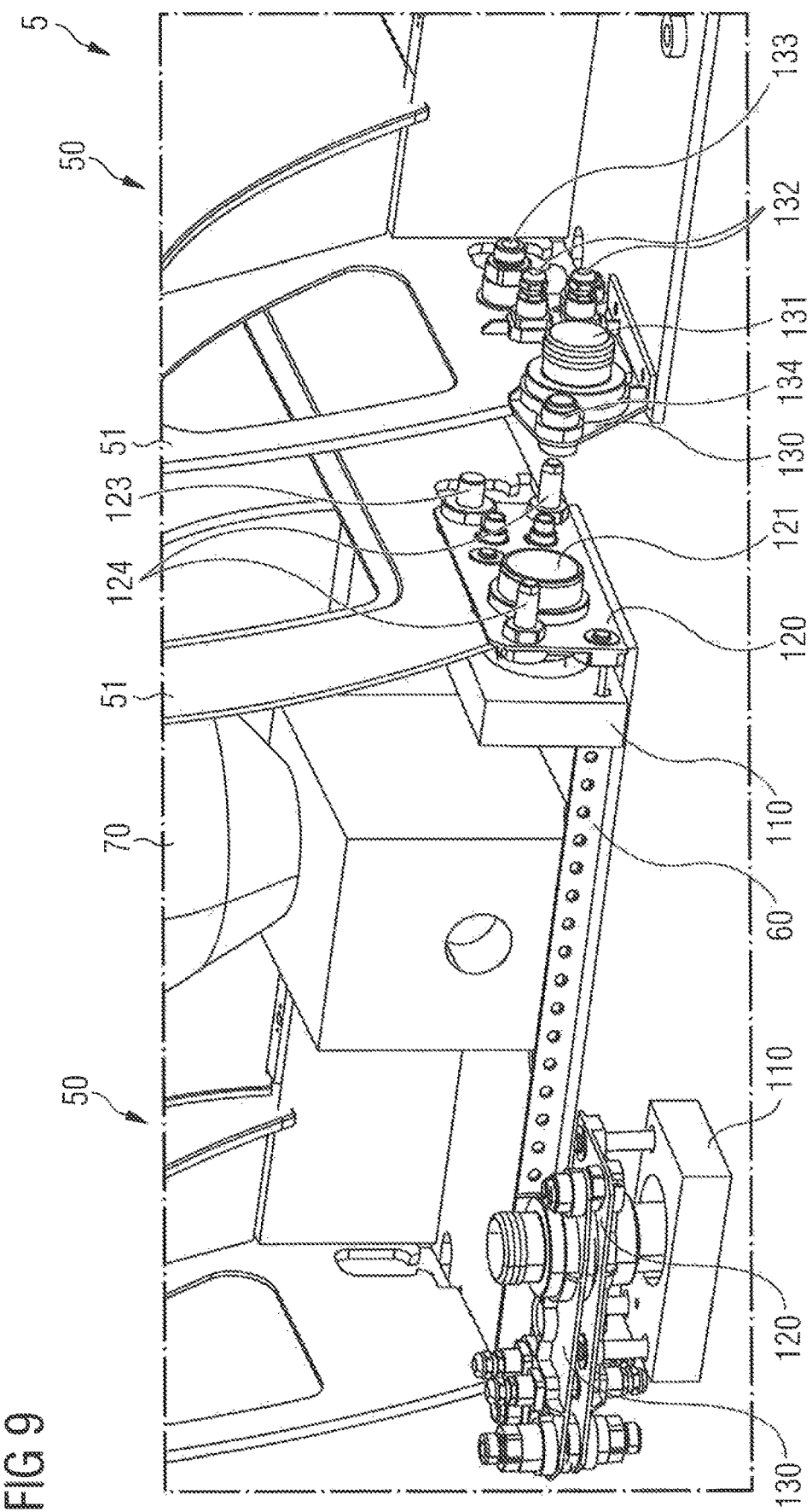
FIG. 9 schematically shows a perspective view of an aircraft area with one monument and two multipurpose connectors.

FIG. 9 schematically shows a perspective view of an aircraft area 5 with two monuments 50 and two multipurpose connectors 100. The multipurpose connector 100 illustrated on the left in FIG. 9 corresponds for example to those from FIGS. 1 to 7. The monument illustrated on the left in FIG. 9 has a further multipurpose connector 100 in addition to the horizontally oriented multipurpose connector 100 (on the left in FIG. 9). More specifically, the monument 50 illustrated on the left in FIG. 9 has a base bracket 110 and a system connector plate 120 of a multipurpose connector 100. These are arranged on or integrated in a side wall 51 of the monument 50. For this purpose, both the base bracket 110 and the system connector plate 120 are oriented vertically, whereas the line adapters 121-124 are oriented horizontally. The line adapters 121-124 of the vertically oriented multipurpose connector 100 are connected to the line adapters 131-134 of the horizontally oriented multipurpose connector 100 (on the left in FIG. 9), which is not shown in FIG. 9 for the purposes of a simpler illustration. For example, it is possible here for lines 161, 162 to run in a manner corresponding to the implementation variants illustrated in FIGS. 5a-5c to 8.

In order to connect a further monument 50 (partially illustrated on the right in FIG. 9) to the system-side lines (for example lines 161, 162), the further monument 50 has at least one monument connector plate 130. The monument connector plate 130 is likewise arranged on or integrated in a side wall 51 of the further monument 50. The line adapters 131-134 of the vertically oriented monument connector plate 130 correspond in terms of their position to the line adapters 121-124 of the vertically oriented system connector plate 120 of the first monument 50 (on the left in FIG. 9). Alternatively, the line adapters 131-134 may also be integrated into the side wall of the monument 50 without a separate monument connector plate 130. In any case, in this way, after the installation of the first monument 50, a further monument 50 can be quickly and easily installed into the aircraft 1 and connected to the system-side lines by means of the line adapters 121-124, 131-134 of the vertically oriented system connector plate 120 and monument connector plate 130 in the respective monuments 50. In this way, the same components that are used for the horizontally oriented multipurpose connectors 100 fastened to the primary structure 2 of the aircraft 1 can also be used for the connection between two monuments 50. This not only reduces the number of components to be produced and stocked, but also reduces the number of working steps during the connection of two monuments 50 in an aircraft 1.

Figure 10:
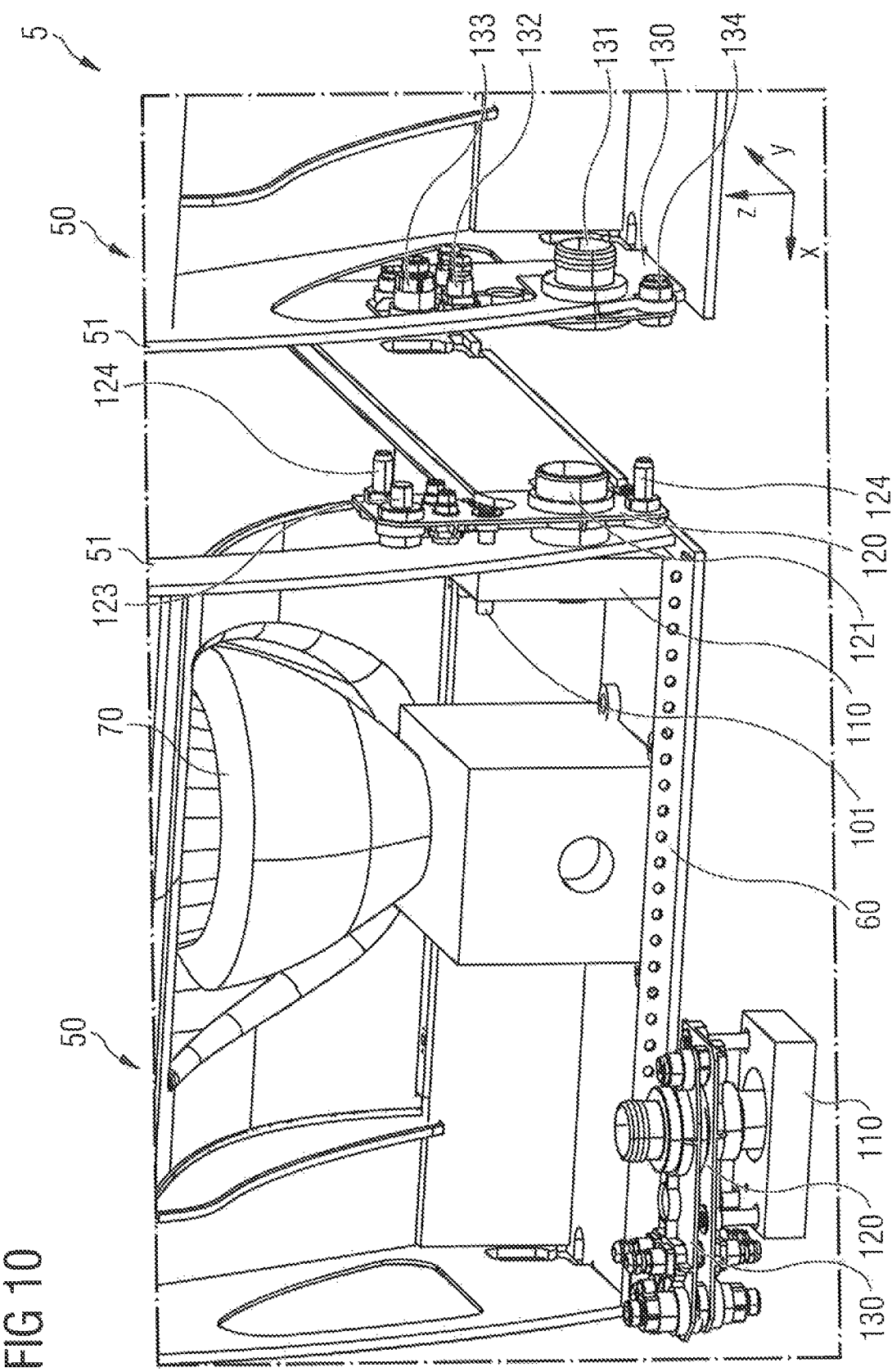
FIG. 10 schematically shows a further perspective view of an aircraft area with one monument and two multipurpose connectors.

FIG. 10 schematically shows a further perspective view of an aircraft area 5 with two monuments 50 and two multipurpose connectors 100. The illustration of FIG. 10 corresponds to that from FIG. 9, wherein the vertically oriented multipurpose connector 100 between the two monuments 50 has been rotated through 90°. In this way, the vertically oriented multipurpose connector 100 takes up less space on or in the side wall 51 in the depth direction of the monuments 50 (Y axis in the installed state in the aircraft 1). Depending on the monument type, the vertically oriented multipurpose connector 100 may be arranged in any position on or in the side wall 51. Here, it is merely necessary for two monuments 50 that are to be connected to one another to have a system connector plate 120 and monument connector plate 130, respectively, which are correspondingly oriented relative to one another. Thus, the vertically oriented multipurpose connector 100 need not imperatively be provided in a lower, rear corner of the side wall 51, but may be arranged at any desired location. In this way, the routing of lines between the two monuments can be optimized.

FIG. 11 schematically shows an aircraft 1 with an aircraft area 5 with a multipurpose connector 100. The aircraft area 5 illustrated in FIG. 11 may correspond to any of the aircraft areas 5 or monuments 50 described in FIGS. 4 to 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A multipurpose connector for connecting a multiplicity of lines of an aircraft monument, wherein the multipurpose connector comprises:
   a base bracket configured to be fastened to a structural component of an aircraft;
   a system connector plate which is configured to receive a multiplicity of first line adapters;
   a monument connector plate which is configured to receive at least one second line adapter, wherein the monument connector plate together with the base bracket defines a space therebetween, in which the system connector plate is movably arranged; and
   a movement device which is configured to move the system connector plate relative to the base bracket and also relative to the monument connector plate between an open position and a closed position,
   wherein the system connector plate is, in the closed position, arranged relative to the monument connector plate such that the at least one second line adapter of the monument connector plate is operatively connected to an associated first line adapter of the system connector plate, and, in the open position of the system connector plate, the multiplicity of first line adapters and the at least one second line adapter are detached from one another,
   wherein the movement device comprises a threaded spindle and a nut which is screwed onto the threaded spindle and which is connected to the system connector plate, wherein a rotation of the threaded spindle effects a movement of the system connector plate between the open position and closed position, or
   wherein the movement device comprises a rotatably mounted lever which is operatively connected to the system connector plate, wherein a rotation of the lever effects a movement of the system connector plate between the open position and closed position.

2. The multipurpose connector as claimed in claim 1, furthermore comprising:
   at least one guide pin which is fastened to one of the system connector plate and the base bracket and which is mounted in sliding fashion on the other of the system connector plate and the base bracket.

3. The multipurpose connector as claimed in claim 1, wherein each line adapter comprises at least one of the following:
   a guide surface;
   a seal; or
   an electrical contact.

4. The multipurpose connector as claimed in claim 1, furthermore comprising:
   a signal transmitter which is configured to generate a contact signal when the system connector plate is in at least one of the open position or closed position.

5. An aircraft having at least one multipurpose connector as claimed in claim 1.

6. An aircraft monument, comprising:
   at least one multipurpose connector for connecting a multiplicity of lines of an aircraft monument comprising:
      a base bracket;
      a system connector plate which is configured to receive a multiplicity of first line adapters;
      a monument connector plate which is configured to receive at least one second line adapter, wherein the monument connector plate together with the base bracket defines a space, in which the system connector plate is movably arranged; and
      a movement device which is configured to move the system connector plate relative to the base bracket and also relative to the monument connector plate between an open position and a closed position,
      wherein the system connector plate is, in the closed position, arranged relative to the monument connector plate such that the at least one second line adapter of the monument connector plate is operatively connected to an associated first line adapter of the system connector plate, and, in the open position of the system connector plate, the multiplicity of first line adapters and the at least one second line adapter are detached from one another; and
   at least one line, wherein in each case, one line is connected to the at least one second line adapter of the monument connector plate and connects the associated second line adapter to a device arranged in the aircraft monument.

7. The aircraft monument as claimed in claim 6, furthermore comprising:
   at least one holding device which is configured to fasten the monument connector plate of the multipurpose connector at variable positions.

8. The aircraft monument as claimed in claim 7, furthermore comprising:
   an aligning device which is configured to be fastened at variable positions to the holding device and which is furthermore configured to fasten the monument connector plate to the aligning device at variable positions relative to the aligning device.

9. The aircraft monument as claimed in claim 6, wherein the monument connector plate of the at least one multipurpose connector is arranged parallel to a rear wall of the monument.

10. An aircraft area, comprising:
    at least one aircraft monument as claimed in claim 6,
    wherein the base bracket of the multipurpose connector is attached to at least one primary structural component of the aircraft area in a position which is fixed relative to the primary structural component.

11. The aircraft area as claimed in claim 10, furthermore comprising:
    at least one floor element, wherein at least one of the base bracket or the system connector plate of the multipurpose connector is arranged independently of the floor element in the aircraft area.

12. The aircraft area as claimed in claim 10, furthermore comprising:
   at least one floor element,
   wherein at least one of the base bracket or the system connector plate of the multipurpose connector is integrated into the floor element.

13. An aircraft area, comprising:
   at least one multipurpose connector for connecting a multiplicity of lines of an aircraft monument comprising:
      a base bracket;
      a system connector plate which is configured to receive a multiplicity of first line adapters;
      a monument connector plate which is configured to receive at least one second line adapter, wherein the monument connector plate together with the base bracket defines a space, in which the system connector plate is movably arranged; and
      a movement device which is configured to move the system connector plate relative to the base bracket and also relative to the monument connector plate between an open position and a closed position,
   wherein the system connector plate is, in the closed position, arranged relative to the monument connector plate such that the at least one second line adapter of the monument connector plate is operatively connected to an associated first line adapter of the system connector plate, and, in the open position of the system connector plate, the multiplicity of first line adapters and the at least one second line adapter are detached from one another,
   wherein the base bracket of the multipurpose connector is attached to at least one primary structural component of the aircraft area in a position which is fixed relative to the primary structural component.

14. The aircraft area as claimed in claim 13, furthermore comprising:
   at least one floor element,
   wherein at least one of the base bracket or the system connector plate of the multipurpose connector is arranged independently of the floor element in the aircraft area.

15. The aircraft area as claimed in claim 13, furthermore comprising:
   at least one floor element,
   wherein at least one of the base bracket or the system connector plate of the multipurpose connector is integrated into the floor element.

16. The aircraft area as claimed in claim 13, having an aircraft monument, with at least one line,
   wherein in each case, one line is connected to the at least one second line adapter of the monument connector plate and connects the associated second line adapter to a device arranged in the aircraft monument,
   wherein the monument connector plate of the at least one multipurpose connector is arranged parallel to a rear wall of the monument, and
   wherein the monument connector plate is arranged on the aircraft monument such that the at least one line adapter of the monument connector plate and the multiplicity of line adapters of the system connector plate of the multipurpose connector correspond in terms of their position and assume the open position of the system connector plate when the aircraft monument is arranged and fastened in the aircraft area.

* * * * *